(12) United States Patent
Law et al.

(10) Patent No.: US 12,322,113 B2
(45) Date of Patent: Jun. 3, 2025

(54) METHODS AND SYSTEMS FOR TACTILE, TOUCH READABLE LABELS ON TANGIBLE GOODS

(71) Applicants: Katherine Elizabeth Grace Law, Leander, TX (US); Nicholas John Joseph Law, Leander, TX (US)

(72) Inventors: Katherine Elizabeth Grace Law, Leander, TX (US); Nicholas John Joseph Law, Leander, TX (US)

( * ) Notice: Subject to any disclaimer, the term of this patent is extended or adjusted under 35 U.S.C. 154(b) by 387 days.

(21) Appl. No.: 18/108,370

(22) Filed: Feb. 10, 2023

(65) Prior Publication Data

US 2023/0260130 A1     Aug. 17, 2023

Related U.S. Application Data

(60) Provisional application No. 63/309,177, filed on Feb. 11, 2022.

(51) Int. Cl.
| | | |
|---|---|---|
| *G06T 7/90* | (2017.01) | |
| *G06K 7/14* | (2006.01) | |
| *G06T 7/12* | (2017.01) | |
| *G09B 21/00* | (2006.01) | |
| *G09F 3/00* | (2006.01) | |
| *G09F 3/02* | (2006.01) | |

(52) U.S. Cl.
CPC .............. *G06T 7/12* (2017.01); *G06K 7/1413* (2013.01); *G06K 7/1417* (2013.01); *G06T 7/90* (2017.01); *G09B 21/003* (2013.01); *G09F 3/02* (2013.01); *G09F 3/0297* (2013.01); *G06T 2200/24* (2013.01); *G06T 2207/10024* (2013.01); *G06T 2207/20021* (2013.01); *G09F 2003/0272* (2013.01)

(58) Field of Classification Search
CPC ......... G06T 7/12; G06T 7/90; G06T 2200/24; G06T 2207/10024; G06T 2207/20021; G06K 7/1413; G06K 7/1417; G09B 21/003; G09F 3/02; G09F 3/0297; G09F 2003/0272; G06V 10/14
USPC ........................................................ 382/164
See application file for complete search history.

(56) References Cited

U.S. PATENT DOCUMENTS

| | | | | |
|---|---|---|---|---|
| 2003/0232168 A1* | 12/2003 | Fearn | ......................... | G09F 3/02 |
| | | | | 428/34.1 |
| 2004/0008871 A1* | 1/2004 | Smith | .................. | G09B 21/003 |
| | | | | 382/114 |
| 2005/0221260 A1* | 10/2005 | Kikuchi | ............... | G09B 21/003 |
| | | | | 434/112 |
| 2009/0128330 A1* | 5/2009 | Monroe | .................. | G16H 20/17 |
| | | | | 340/568.1 |
| 2010/0314440 A1* | 12/2010 | Maloney | .......... | G06K 19/07762 |
| | | | | 235/375 |
| 2014/0097608 A1* | 4/2014 | Buzhardt | ............... | G09F 3/0297 |
| | | | | 493/320 |

* cited by examiner

*Primary Examiner* — Ali Bayat
(74) *Attorney, Agent, or Firm* — Pierson IP, PLLC

(57) ABSTRACT

Tactile labels with raised touchable and readable projections extending away from a surface of a tangible good, container or package that allow people to quickly recognize and understand the content within the container, wherein the tactile labels may include data that can be extracted via image processing techniques.

10 Claims, 8 Drawing Sheets

METHODS AND SYSTEMS FOR TACTILE, TOUCH READABLE LABELS ON TANGIBLE GOODS

BACKGROUND INFORMATION

Field of the Disclosure

Examples of the present disclosure relate to tactile, touch readable labels on tangible goods to assist the visually impaired, illiterate, and/or children. More specifically, embodiments are directed towards tactile labels with raised projections that extend away from a surface of the tangible good or container allowing people to quickly recognize and understand information associated with the container and the contents in the container, wherein the tactile labels may include data that can be extracted via touch and computer image processing techniques.

Background

A label is a piece of paper, film, cloth, etc. that is affixed or molded onto a container, packaging, or product. The label contains written or printed information or symbols about the product or item. Labels have many uses, including promotion and providing information on a products origin, manufacturer, content, uses, shelf life, ingredients, side effects, hazards associated with the product, etc. Conventional labels are two dimensional and printed directly on the container or applied using adhesives. However, for the visually impaired or situations where labels are not easily visible this form of labeling is ineffective as they are unable to read the labels.

Braille is a form of tactile touchable communication. However, many visually impaired individuals do not know how to read brail, and the dot configuration of braille is cumbersome, can be easily damages, and/or not feasible when applied to certain containers and packaging materials. Furthermore, situations may arise where it is difficult to view labels, such as on the back or underside of appliances.

Accordingly need exist for systems and methods associated with tactile labels with raised projections extending away from a surface of the tangible good, container and/or packaging allowing people to quickly recognize and understand the content within the container and how to access the content in the container wherein the tactile labels may include data that can be extracted via touch and computer image processing techniques.

SUMMARY

Embodiments disclosed herein describe tactile, touch readable labels that are configured to be affixed to, etched into, attached to, or imprinted on containers and packaging. The tactile labels may describe the contents of the packaging, how to access the contents, and provides details on the containers of the container in an efficient and effective manner. In embodiments, responsive to a digital image of the tactile labels being obtained by a digital camera, reader, or scanner, the digital image may be digitally processed to provide more information to the user.

In embodiments, the tactile labels may include tactile symbols representing the contents of the container. For example, a container with shampoo may include a raised tactile element on the outside of the container that includes three raised vertical wavy lines, which may represent hair. In another embodiment, a container with shampoo that has an aroma associated apples may include a raised tactile element on the outside of the container that includes the shape or outline of an apple. Alternatively, the tactile label may include raised tactile elements that spell out the wording "Shampoo" on the surface of the container. The tactile labels may also include tactile symbols representing manufacturing dates associated with the content, a number of items in the package, expiration dates associated with the content inside of the container.

The tactile labels may also include tactile symbols to convey how to access the contents of the container. For example, the tactile symbols may be symbols or lettering associated with words push, pull, turn, cut, hold, this way up or down, etc.

The tactile labels may include tactile symbols that include raised bar codes, QR codes, or other types of three-dimensional codes that are configured to be digitally captured. The tactile symbols associated with the code may be an exact representative of the digital code with elevated surfaces. However, in other embodiments, the tactile symbols may include contoured or textured surfaces on the elevated surfaces and markers, which may allow the three-dimensional tactile symbol to be digitally captured while positioned on a curved surface. In embodiments, the tactile symbols may be a single symbol that represents the entirety of the message the symbol conveys, which may reduce space necessary to determine information associated with the symbol.

The tactile labels may include textured surfaces applied to some or the entire container. The surface of the container may vary to represent a wide variety of tactile touch information to the consumer. For example, the textured surface may identify a brand, identify a product or product line, correspond with different textured products applied to other containers, such that the multiple and different textured surfaces fit together like a puzzle.

Advantageously, the raised tactile symbols on the labels may assist the visually impaired, illiterate and children to recognize and understand the content of the container. Further, because the raised tactile symbols may be associated with the contents of the container, users may efficiently and effectively identify the contents of the container. For example, a user may be able to tell the contents of the container in the dark, when the container is within a drawer, behind an appliance, or other hard to access areas.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
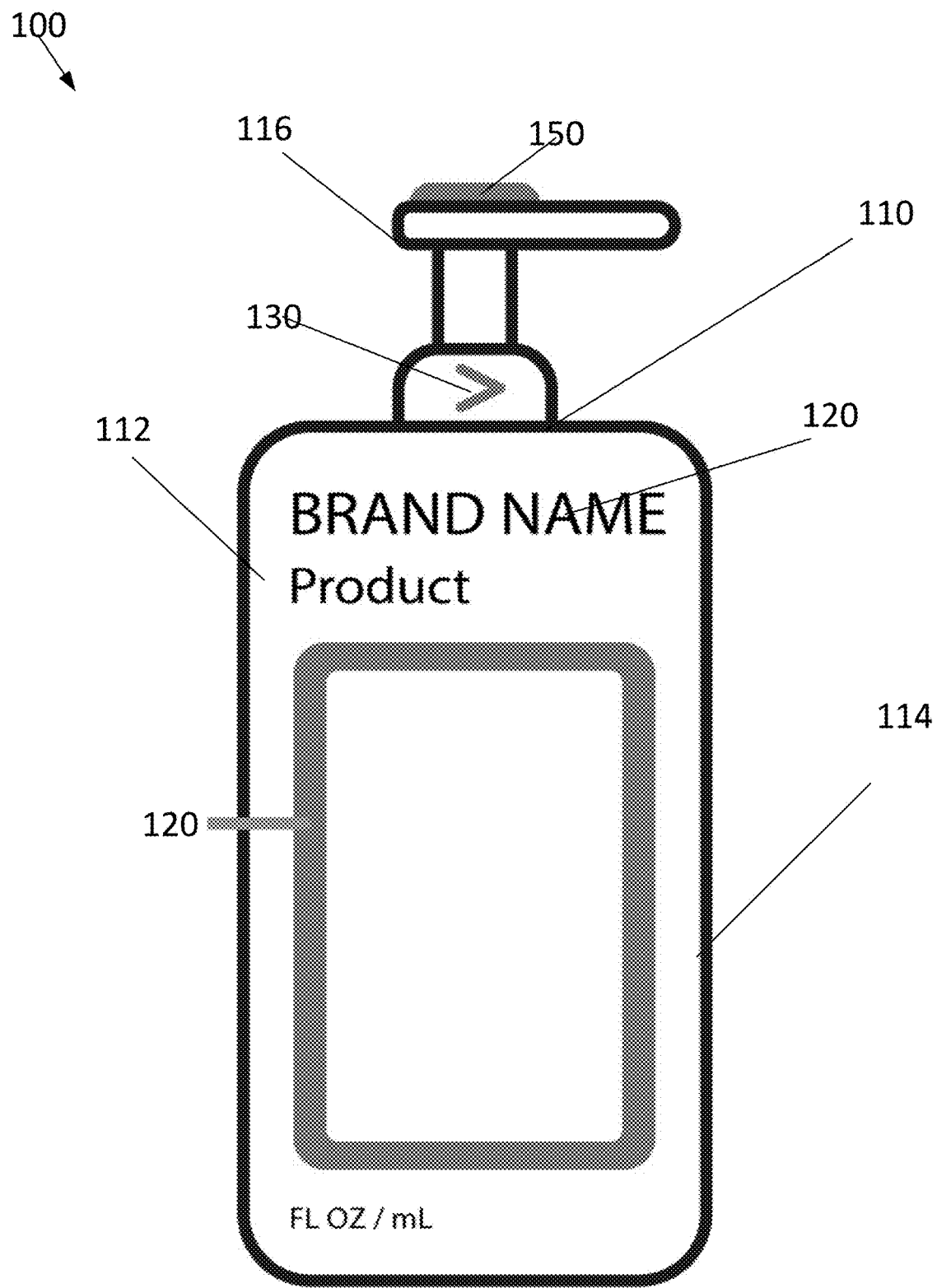
FIG. 1 depicts a front view of a system for raised tactile labels, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

FIG. 1 depicts a front view of a system 100 for raised tactile labels, according to an embodiment. System 100 may be configured to assist people in rapidly determining information associated with and within a container 110 by touch without visually seeing the container 110.

Container 110 may be a bottle, package, bag, jar, box, wrap, or any other device with at least one curved surface that is configured to store and secure objects within the container 110. Container 110 may include an outer surface 112 and an inner surface (not shown). Container 110 may be formed of various materials, such as plastics, metals, paper, etc. Container 110 may include a body 114 and cap 116. Body 114 may be configured to secure objects, such as medicine, pills, food, solids, fluids, etc. Cap 116 may be positioned over body 114 and be configured to selectively secure the objects within body 114. In embodiments, cap 116 may be a twist cap, dispensing mechanism, removable top, or any other type of mechanism that may secure objects within body 114.

Positioned on outer surface 112 of container 110 may be text based labels 120, first tactile element 120, second tactile element 130, third tactile element 140, and fourth tactile element 150.

Text based labels 120 may be conventional labels with text or images on them that identify the contents of container 110, information associated with the contents of container 112, such as a brand name, sizing information, ingredients, directions of use, and/or other information associated with container 110. In embodiments, text based labels 120 may be printed directly onto outer surface 112 of container or affixed onto outer surface of container 112 via adhesives.

First tactile element 130 may be positioned on a curved surface, and may include a series of projections, ridges, bumps, etc. that creates a tactile profile on outer surface 112 of body 114. In embodiments, first tactile element 130 may be configured to convey information associated with the objects positioned within body 114, wherein a shape, size, stylization of first tactile element may correspond and directly correlate with the objects positioned within body 114. For example, if body 114 contained shampoo, then first tactile element 130 may be a raised tactile symbol on outer surface 112 that had a tactile raised square box including multiple vertical parallel wavy lines that extend along a longitudinal axis of body 114, which may represent hair. Supplemental products, such as conditioner, may have corresponding or similar tactile elements. For example, conditioner may include raised parallel wavy lines that extend along a lateral axis of body 114. In other embodiments, first tactile element 130 may include raised letters corresponding to the type or name of product, or be recognizable symbols (e.g. shape of an apple) that depict information about the content within container 110.

Second tactile element 140 may be positioned on cap 116 or another curved surface, may include a series of projections, ridges, bumps, etc. that creates a tactile profile on outer surface 112 of cap 116. Second tactile element 140 may convey how to access the contents of container 110. For example, second tactile element 140 may be a raised arrow, wherein the arrow points in a direction that the user should turn the cap 116 to open cap 116. In other embodiments, second tactile element 140 may include raised letters corresponding to instructions on how to open cap 116.

Figure 4:
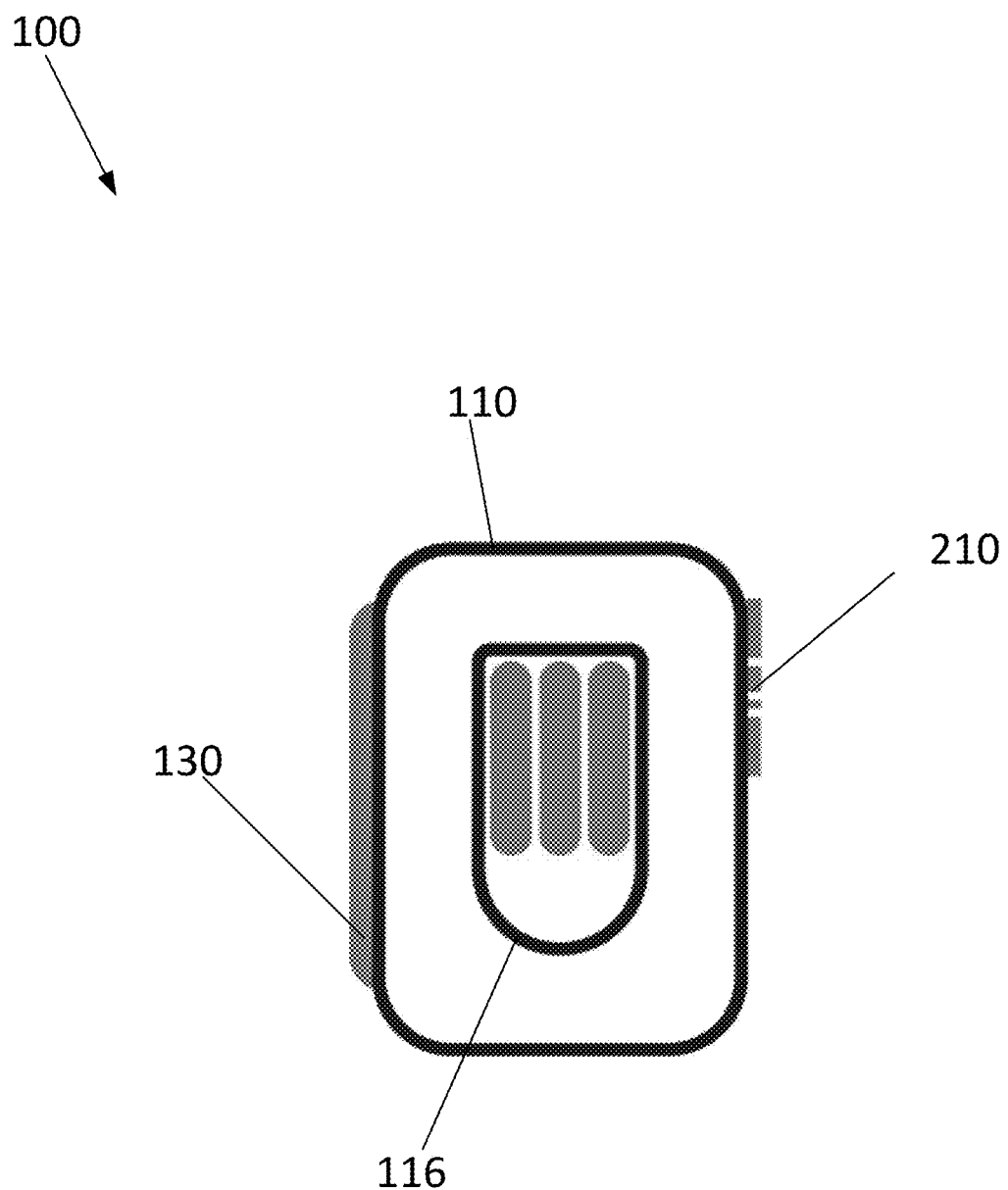
FIG. 4 depicts a top view of system for raised tactile labels, according to an embodiment.

Third tactile element 150 may be positioned on top of cap 116, and may include a series of projections, ridges, bumps, etc. that creates a tactile profile on outer surface 112 of cap 116. Third tactile element 150 may convey how to access the contents of container 110. For example, third tactile element 150 may be a raised thump print, user interface, or raised letters corresponding to the word "pump to open cap 116. As depicted in FIG. 1, third tactile element 150 projects away from the upper surface of cap 116. This projection of third tactile element 150 may create third tactile element 150. Alternatively, the third tactile element 150 may convey the contents of container such as three lines representing shampoo, as depicted in FIG. 4.

In embodiments, each of the first tactile element 130, second tactile element 140, and third tactile element 150 may be directly molded onto container 110 through and during an injection molding process or etched into container 110. This may allow container 110, first tactile element 130, second tactile element 140, and third tactile element 150 to be a unified element. In other embodiments, first tactile element 130, second tactile element 140, and third tactile element 150 may be formed and later affixed to container 110. For example, first tactile element 130, second tactile element 140, and third tactile element 150 may each include an adhesive layer and a tactile layer, wherein the adhesive layer is coupled to the tactile layer. The adhesive layer may then be coupled to container 110. In embodiments, the tactile layer may be formed of plastics, rubbers, metal, etc. or any other rigid material than can be molded into desirable shapes, symbols, etc.

In embodiments, the outer surfaces of the raised projections that form first tactile element 130, second tactile element 140, and third tactile element 150 may be positioned at different heights. With spacing between the raised projections forming different portions of the tactile elements. This spacing and varying heights may create shadows on other portions of the tactile elements, which may be utilized for digital image processing.

Figure 2:
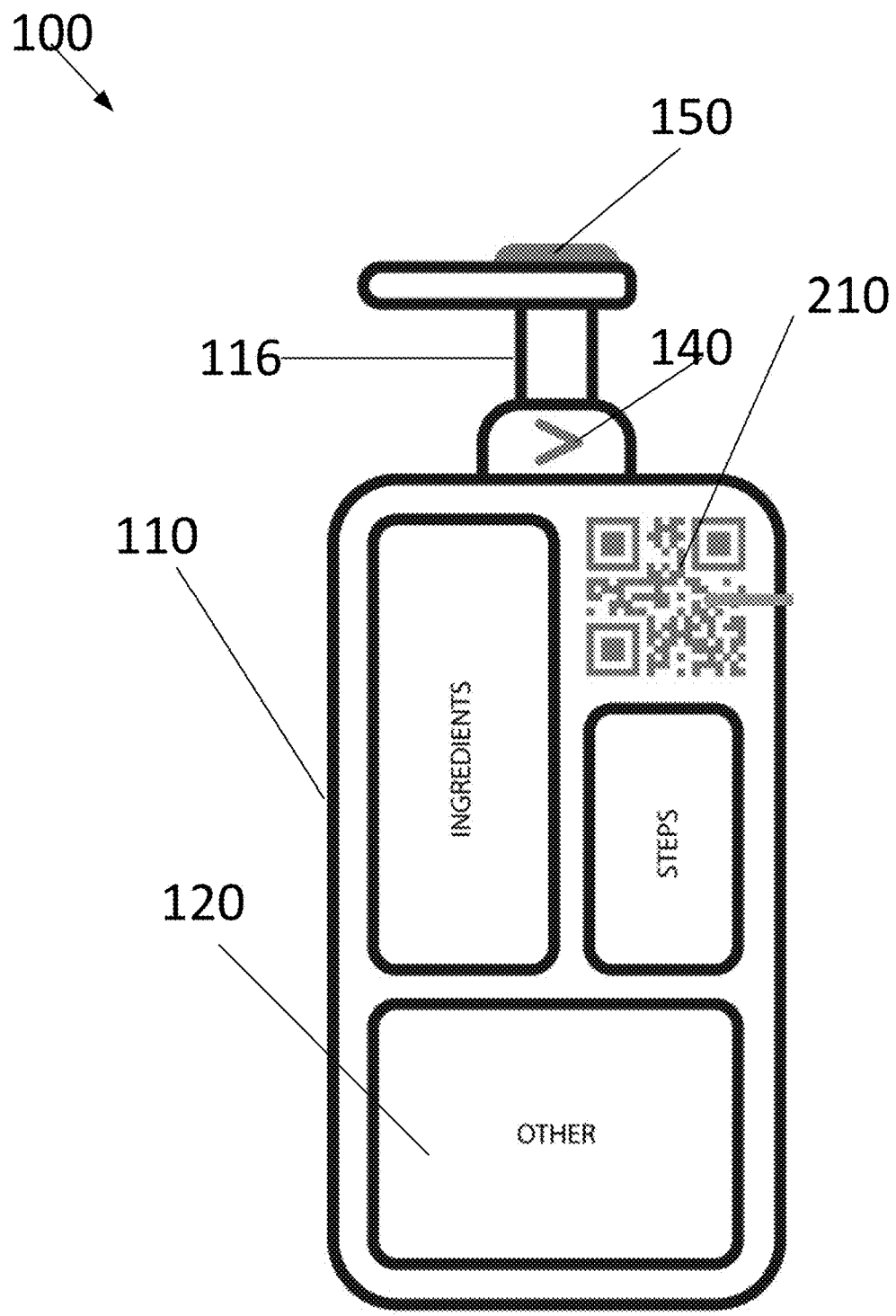
FIG. 2 depicts a rear view of system for raised tactile labels, according to an embodiment.

FIG. 2 depicts a rear view of system 100, according to an embodiment. Elements depicted in FIG. 2 may be described above, and for the sake of brevity a further description of these elements is omitted.

As depicted in FIG. 2, text-based labels 160 may be positioned on a rear surface of container 110, wherein the rear surface of container 110 may be curved. Rear surface of container 110 may also include fourth tactile element 210. Fourth tactile element 210 may include a series of projections, ridges, bumps, etc. that creates a tactile profile on outer surface 112 of container 110, wherein the series of projections, ridges, bumps, etc. correspond with a QR code, bar code, matrix barcode, or any other three-dimension code to represent information. In embodiments, the series of raised projections may have different heights, which creates varying shadows on the other raised projections within fourth tactile element 210.

Fourth tactile element 210 may be a machine-readable optical label that includes information about the item to which it is attached to, wherein fourth tactile element 210 may be configured to be read by an imaging capturing device, and processed using imaging processing techniques to interpret the captured image. The processed data may then be extracted from patterns that are present in longitudinal, lateral, and vertical components of the captured image associated with fourth tactile element 210.

Figure 3:
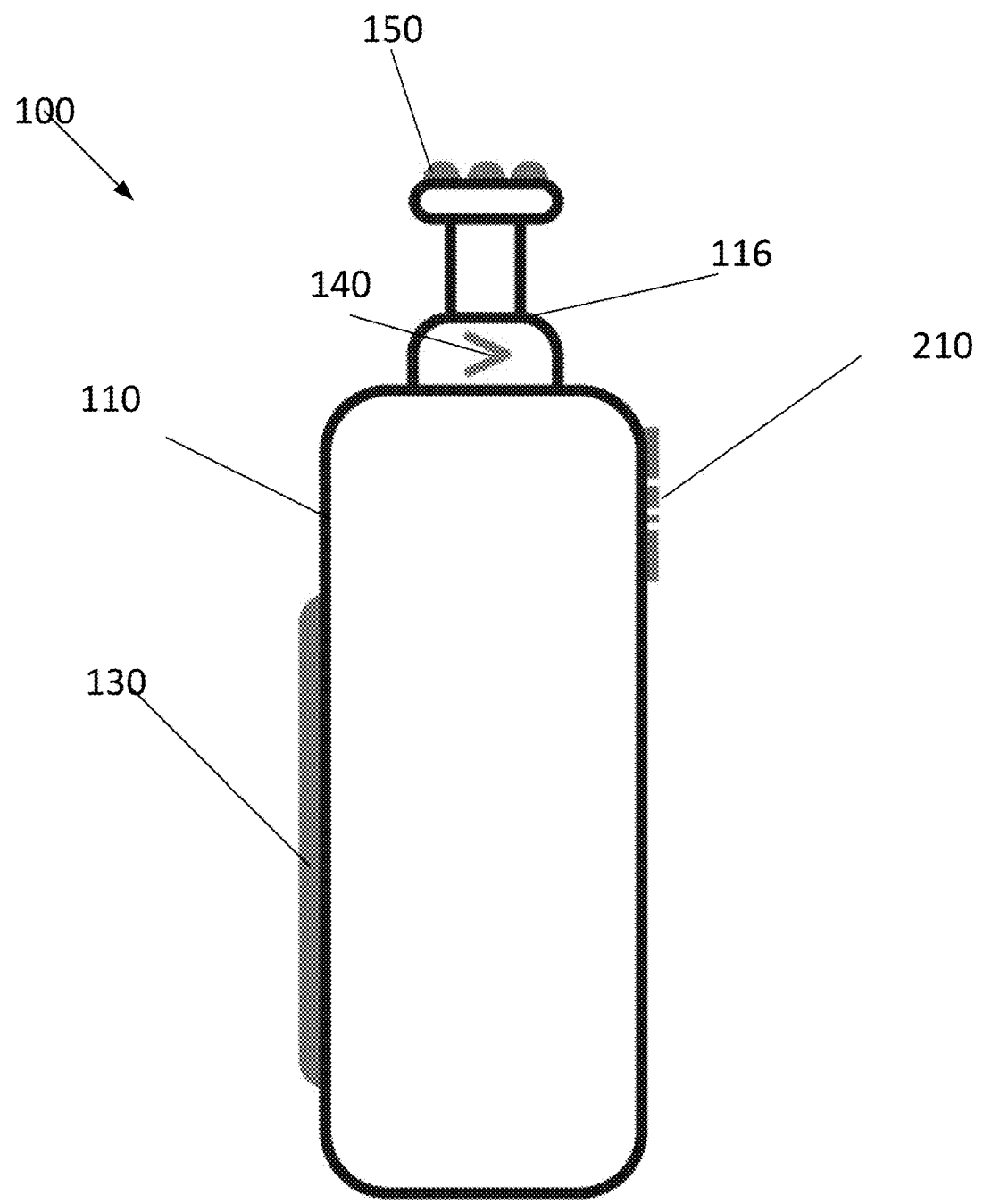
FIG. 3 depicts a side view of system for raised tactile labels, according to an embodiment.

FIG. 3 depicts a side view of system 100, according to an embodiment. FIG. 4 depicts a top view of system 100, according to an embodiment. Elements depicted in FIGS. 3 and 4 may be described above, and for the sake of brevity a further description of these elements is omitted.

As depicted in FIGS. 3 and 4, first tactile element 130, second tactile element 140, third tactile element 150, and fourth tactile element 210 may project away from an outer surface 112 of container 112. This may create a non-uniform profile on outer, curved, surface of container 112, which may assist users in determining the contents of and information's associated with container and assist in accessing the contents of the container 110.

Figure 5:
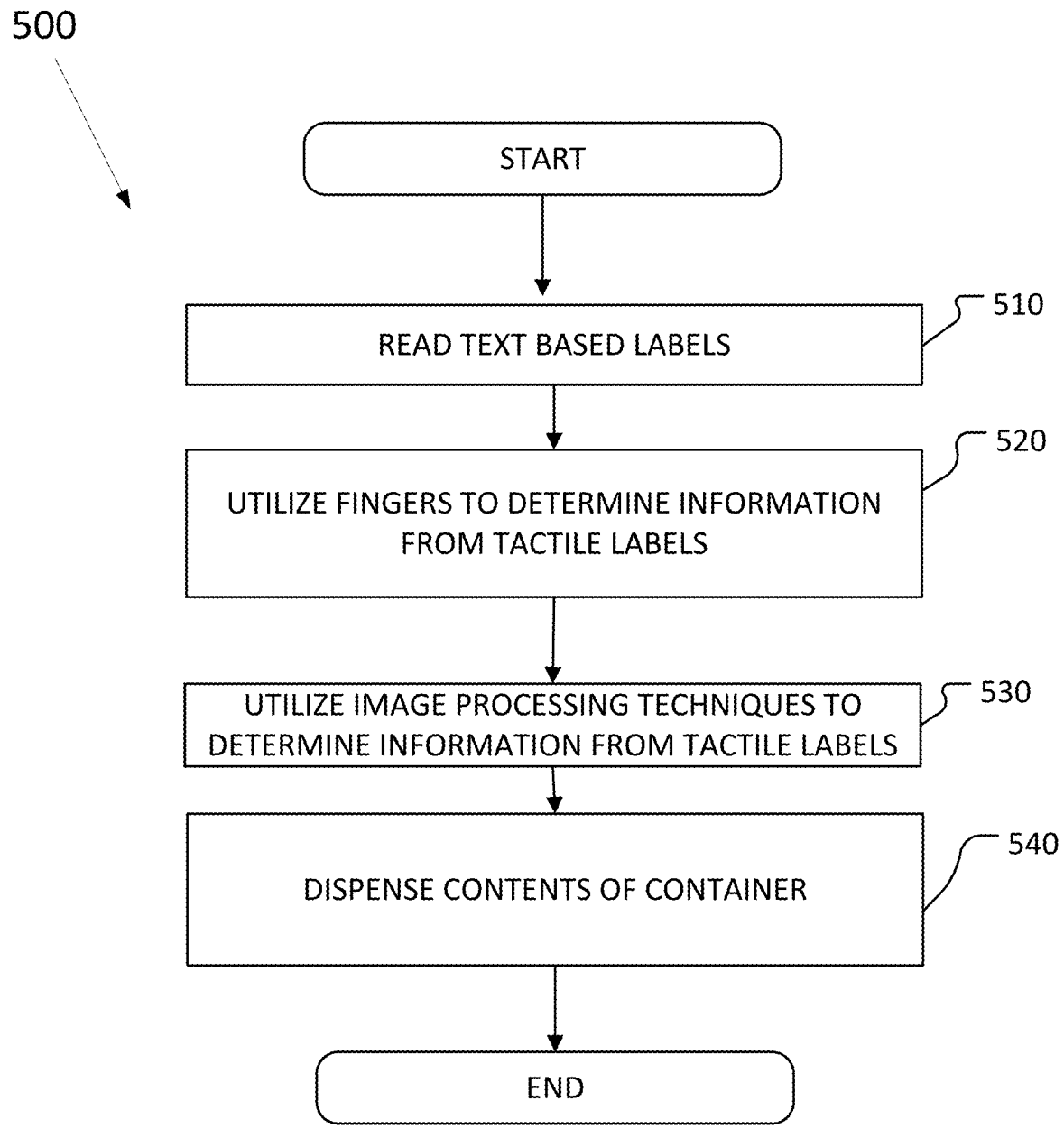
FIG. 5 depicts a method for utilizing textile labels on a container, according to an embodiment.

FIG. 5 depicts a method 500 for utilizing textile labels on a container, according to an embodiment. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

At operation 510, a user may read text based labels on a container.

At operation 520, the user may move their fingers over raised tactile labels on the outer surface of the container to determine information regarding the container, objects stored within the container, and/or how to access the contents within the container. The raised tactile labels may be symbols corresponding to the container and/or the objects stored within the container.

At operation 530, an image of another raised tactile label may be captured by an imaging device, and processed using imaging processing techniques to interpret the data. The data may then be extracted from patterns that are present in longitudinal, lateral, and vertical components of the captured image associated with fourth tactile element. This data may be displayed on a display associated with the imaging device or verbally conveyed via the imaging device, such as a mobile phone.

At operation 540, the user may use the information obtained and conveyed by the imaging device and the tactile labels to utilize the container and the objects stored within the container.

Figure 6:
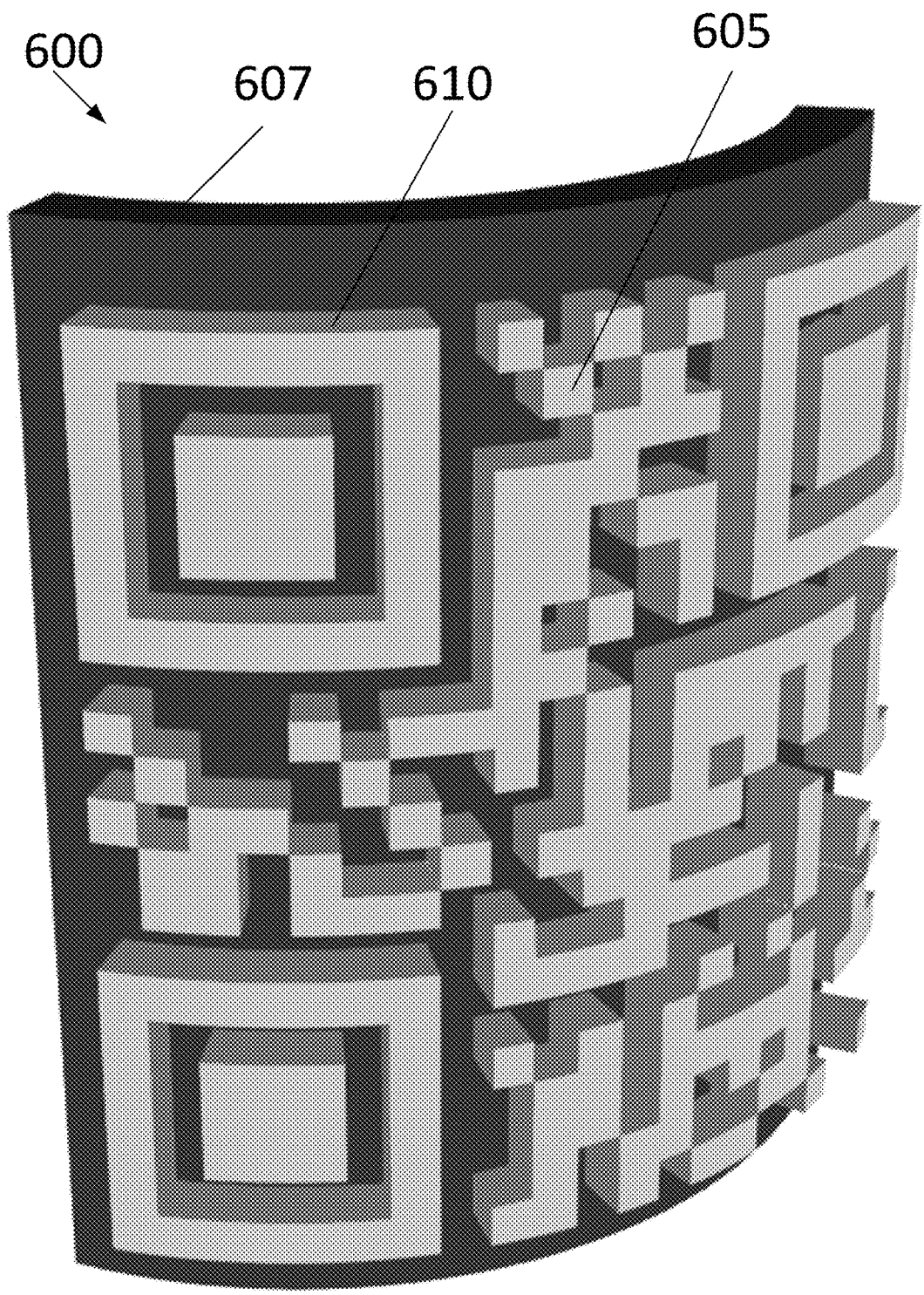
FIG. 6 depicts a perspective view of a raised tactile symbol, according to an embodiment.

FIG. 6 depicts a perspective view of a raised tactile symbol 600, according to an embodiment. Raised tactile symbol 600 may include projections 605, a surface 607, and outer edges 610. In embodiments, projections 605 or portions of projections 605 may be formed of different colors, and projections 605 may be spaced apart in a varying topology such that projections 605 may form shadows on adjacent projections 605 on a curved surface 607. In embodiments, multiple corners of raised tactile symbol 600 may include distinct patterns of the same raised projections. These distinct patterns and variations caused by projections 605 on adjacent pixels may be utilized to determine the corners of raised tactile symbol 600, which then can be utilized to determine the locations of outer edge 610.

In embodiments, the tactile nature of the label projects distinctive shadows that will change in color, shade, and density a camera is moved and captures different portions of the tactile label. These changes in shadows represented by adjacent pixel-to-pixel variations in color, shade, and density appear for tactile symbols 600 but cannot be present on a container surface that does not have a tactile label (i.e. flat, even rounded). In the case of no tactile label present on the container, there is adjacent pixel-to-pixel continuity of color, shade, and density even as the container is tilted or rotated.

Furthermore, once the tactile label capture process begins, a computer processor may begin comparing data associated with a segment of a captured tactile label and correlates in real-time the captured label and segments of label with a mapping of data associated with tactile labels and segments of tactile labels. The real-time correlation or matching process and feedback to the computer processor enable the capture process to adjust in real-time with suggested tactile matching recommendations. This real time correlation may further assist in determine edges of the tactile label, based on the percentage confidence of the tactile label on the container matching a known tactile label and form in the catalog/database.

In embodiments, a mapping of different tactile symbols 600 may be formed. Each entry in the mapping of different tactile symbol 600 may correspond to a specific tactile symbol 600, and may include data that corresponds to each partition of a raised tactile symbol 600. For example, tactile symbol 600 may be partitioned into nine different segments, that include data about pixel-to pixel variations in average color data, shadow data, and density of pixels. Utilizing the data corresponding to different tactile symbols 600, and image capture device may only need to capture portions of raised tactile symbol 600 to determine what captured raised tactile symbol 600 correlates with an entry in the mapping.

In embodiments, during a matching process of tactile symbol 600 an entries within the mapping, there may be instances where a partially captured (curved) tactile symbol 600 results in either a perfect match or a high probability match with a portion, grid subsection, etc. of a of an entry of a tactile symbol within the mapping. When a match between a portion of a captured tactile symbol 600 a portion of an entry within the mapping, then the "partial" tactile symbol is stored and aligned/matched/attached/referenced to the complete mapping of the entry of the tactile symbol within the mapping. This may lead to situations where subsequent capturing of the tactile symbol is compared not only against full tactile symbols of entries in the mappings but also partial entries of matched mappings stored associated with the full tactile symbol. In this manner, a complete tactile symbol in the mapping could have many (i.e. hundreds) of partial matches associated with the tactile symbol in the database that is used in the matching process. Utilizing only portions of the mappings corresponding to matches of portions of the tactile symbol within the mapping may more efficiently match captured tactile symbols or only portions of captured tactile symbols process when the entire tactile symbol is not captured through the camera before an exact match is made and the information associated with the tactile symbol is communicated to the user.

Figure 7:
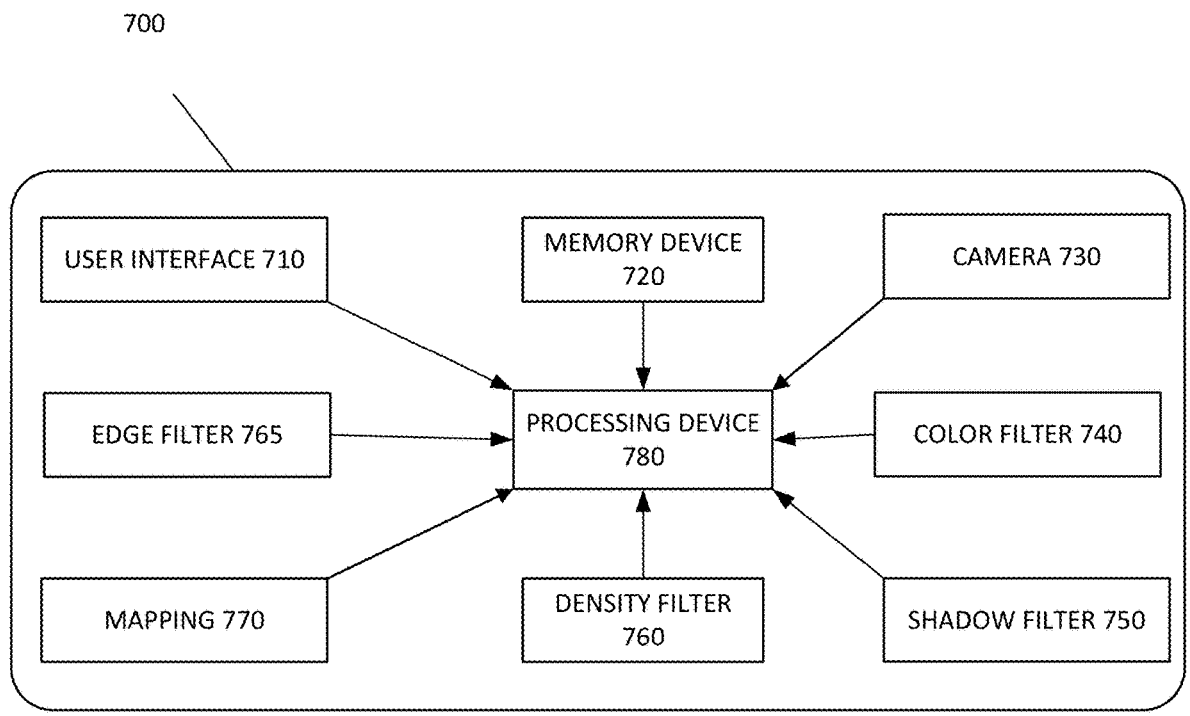
FIG. 7 depicts an image capturing and processing device that is configured to determine a correlation between a captured raised tactile symbol and an entry with a mapping of tactile symbols, according to an embodiment.

FIG. 7 depicts an image capturing and processing device 700 that is configured to determine a correlation between a captured raised tactile symbol and an entry with a mapping of tactile symbols, according to an embodiment. Capturing and processing device 700 may include a user interface 710, memory device 720, camera 730, color filter 740, shadow filter 750, density filter 760, mapping 770, edge filter 765, and processing device 780.

In embodiments, capturing and processing device 700 may be a smart phone, tablet, camera, etc.

The user interface 710 may be a touch screen, button, controller, joystick, speaker, microphone, etc., wherein the user interface 710 is configured to receive inputs from a user, and communicate information to the user. In embodiments, responsive to the user utilizing the user interface 710, the user may begin recording images.

The memory device 720 may be a device that comprises non-transitory storage media that electronically stores information. The memory device 720 may include one or both of system storage that is provided integrally (i.e., substantially non-removable) within capturing and processing device 700 and/or removable storage that is removably connectable to capturing and processing device 700 via, for example, a port (e.g., a USB port, a firewire port, etc.) or a drive (e.g., a disk drive, etc.). The memory device 720 may include one or more virtual storage resources (e.g., cloud storage, a virtual private network, and/or other virtual storage resources). The memory device 720 may store software algorithms, information determined by a processor, information received from the camera, and/or other information that enables capturing and processing device 700 to function as described herein. For example, the memory device 720 may be configured to store a mapping associated with raised tactile symbols. Data associated with the mappings with the preselected colors may be utilized by color filter 740, shadow filter 750, density filter 760, mapping 770, edge filter 765, and processing device 780.

The camera 730 may be a device that is configured to record still images or videos. The camera 730 may be an optical instrument configured to record images, which may be stored on the memory device. The images may be still photographs or sequences of images comprising videos or movies. For example, the camera 730 may be a camera located on a smart phone, web cam, tablet, etc. The camera 730 may be configured to record images continuously and/or over repetitive intervals. The recorded images may be processed via a color filter 740, shadow filter 750, density filter 760, edge filter 765, mapping 770, and processing device 780.

The color filter 740 may be a computer hardware processor configured to determine colors within an image captured by camera 730. Color filter 740 may also be configured to determine colors of pixels that are adjacent to color markers within an image, wherein the color markers may be a predetermined color of a pixel, such as a red pixel, blue pixel etc. To this end, color filter 740 may determine the locations of color markers within a captured image, and subsequently determine what are the colors of pixels within the captured image that are adjacent to the color marker.

Shadow filter 750 may be a computer hardware processor configured to determine shadows associated with a captured raised tactile label. In embodiments, shadow filter 750 may be configured to determine shadows within a captured image based on the projections of the raised tactile label. Specifically, shadow filter 750 may determine average chrominance, coloring, etc. associated with a specific partition of a captured image, and determine that the average chrominance is lighter or darker than other portions of the captured image. This average chrominance may indicate that a shadow is created by a raised tactile label on other portions of the raised tactile label. In other embodiments, other image processing techniques may be utilized to determine locations of shadows within a captured image of a raised tactile label.

Density filter 760 may be a computer hardware processor configured to a density of raised portions of a raised tactile label and a background of the raised tactile label. In embodiments, density filter 760 may be configured to determine the density information within only a portion of the captured image. Density filter 760 may be configured to determine the density information based on the relative coloring of pixels within a captured image, wherein a background of the raised tactile label may be a different color than the raised projections. However, in other embodiments different image processing techniques may be utilized to determine density within portions of an image of a raised tactile label.

Edge filter 765 may have a hardware computing device that is configured to determine the edges of a raised tactile label, and create a finite grid overlay on a surface of a container where the raised tactile label is positioned. In embodiments, edges of a raised tactile label may include distinct edges when comparing adjacent pixels. Specifically, the edges may have different color data, shadow data, and density data than other portions of the raised tactile label. These distant data may be present in the raised tactile label, but not on the container surface that does not have the raised tactile label. Utilizing edge filter 765, processing device 780 may determine a location of at least one corner of the raised tactile label, and create a set of arbitrary coordinates and partitions/grid of the captured image.

Mapping 770 may be a hardware memory device that is configured to store information associated with a raised tactile label. Mapping 770 may include a plurality of raised tactile label, wherein each entry may include edge data, color data, shadow data, and density data. Furthermore, each entry may include a plurality of partitions that each correspond to a partition of a grid of a raised tactile label, wherein each partition includes edge data, color data, shadow data, and density data. Utilizing the data associated with a given partition, processing device 780 may be configured what raised tactile label corresponds with a captured image. Mapping 770 may also include further information associated with the raised tactile label, which may be presented on user interface 710. For example, the further information may be a link to a website, auditory or pictorial commands, etc.

Processing device 780 may be a hardware computer device that is configured to utilize mapping 770 and a captured image, or portions of a captured image of a raised tactile label to correlate the captured image and an entry within mapping 770. Processing device 780 may be configured to receive a captured image, determine the edges of the captured image that correlate with a raised tactile label, and create a grid overlay utilizing the determined edges of the picture. Processing device 780 may then determine an individual segment or partition of the image, and calculate color data, density data, and shadow data associated with the captured image. Subsequently, processing device 780 may filter and remove entries within mapping 770 that do not entries of partitions that correlate with the calculated color data, shadow data, and/or density data, to create a potential entry list. As the camera 730 continues to capture more data associated with the raised tactile label, processing device 780 may determine a second segment or partition of the image associated with the raised tactile label, and determine an individual segment or partition of the image, and calculate color data, density data, and shadow data associated with the second segment associated with the raised tactile label. Subsequently, processing device 780 may filter and remove entries within mapping 770 that do not entries of the potential entry list that correlate with the calculated color data, shadow data, and/or density data of the second segment to create a secondary potential entry list. This procedure may be repeated until only a single entry remains. At that point, processing device 780 may present the further information associated with the entry on the user interface 710. To this end, an entity or the raised tactile image may not need to be captured to correlate a captured image with an entry within a mapping.

Figure 8:
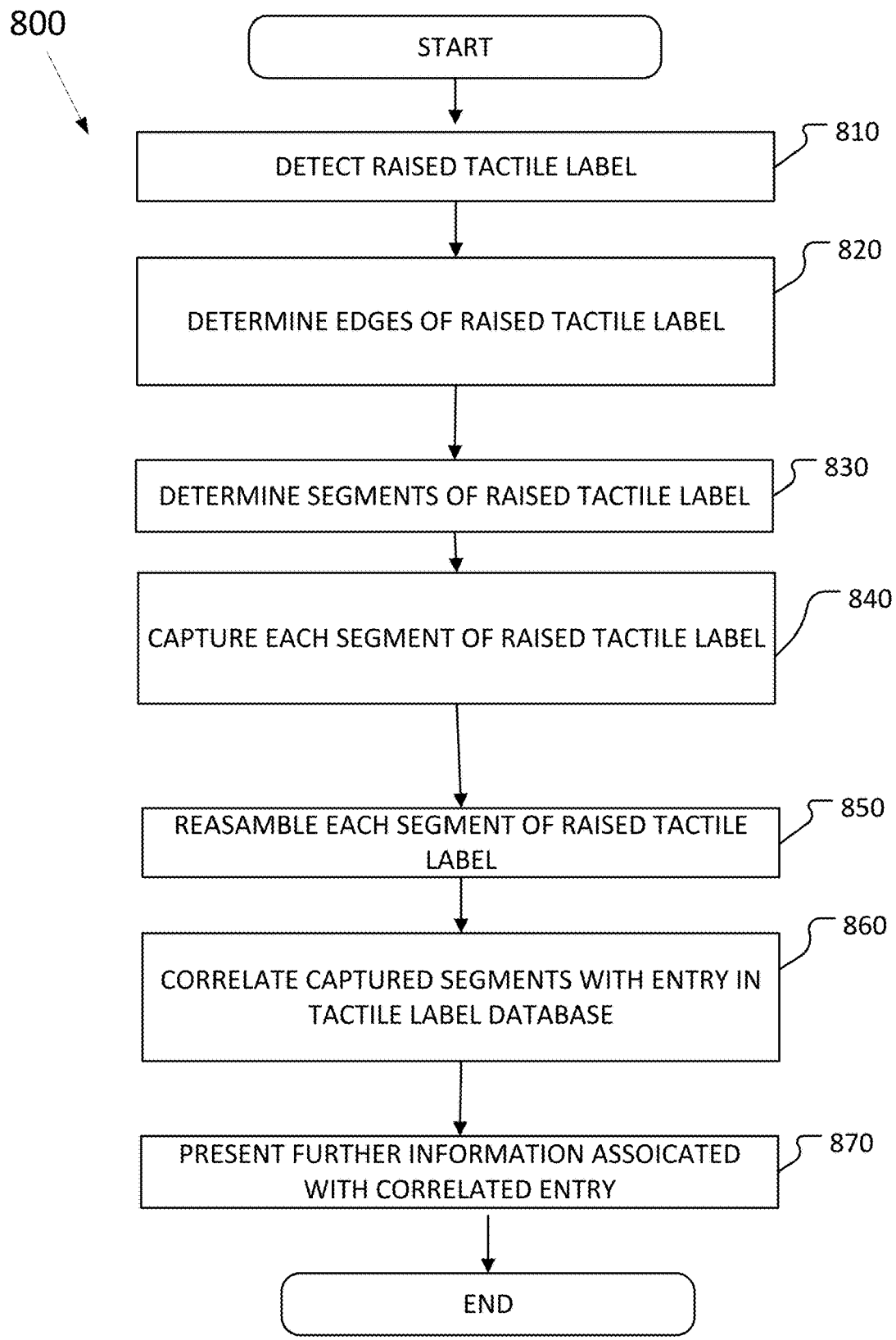
FIG. 8 depicts a method for utilizing textile labels on a container, according to an embodiment.

FIG. 8 depicts a method 800 for utilizing textile labels on a container, according to an embodiment.

At operation 810, a computer processing device may detect a raised tactile label, and capture an image of the raised tactile label on the curved surface. The computer processing device may detect the raised tactile label by image processing techniques, such as processing a captured image to determine color data, shadow data, and density data associated with portions of the captured image.

At operation 820, the computer processing device may determine edges and segments associated with the raised tactile label. The computer processing device may determine the edges of the raised tactile label within the captured image by determine an upper right and lower left coordinate of the curved tactile label.

At operation 830, the rectangular segments associated with the raised tactile label may be captured. The rectangular segments may be created by the computer processing device applying a curved rectangular grid over the captured raised tactile label from the upper corner on a first side of the captured raised tactile label to a lower corner on a second side of the captured raised tactile label. Each segment may have an upper bound, lower bound, first side, and second side bound, wherein each segment may be individually image processed. By segmenting the captured raised tactile label in different segments, data associated with the different segments may be captured incorrectly, while not impacting the correlating of the mapping.

At operation 840, the computer processing device may move from the first side of the captured raised tactile label to a second side of the raised tactile label either by moving the computer processing device or rotating a container where the raised tactile label is positioned on. This may enable each of the rectangular segments is flat to a face of the camera. Furthermore, audible signals or sounds may be emitted from the computer processing device once the contents of a single rectangular segment has been captured, and a different signal or sound may be emitted when each of the rectangular segments has been captured.

At operation 850, the data for each of the captured segments of the curved tactile label may be reassembled as a segment of a flat tactile label.

At operation 860, image processing techniques may be performed to correlate the captured segments of the curved tactile label with an entry within a tactile label database. The image processing techniques may be based on color data of a segment, density data of a segment, and shadow data of a segment of a captured raised tactile symbol. Once these values are determined entries within a mapping may be filtered by removing entries that don't have segment data that correlates with the segment of the captured raised tactile symbol. Entries may then be further filtered and removed for a second segment of the captured raised tactile symbol until there is only one entry within the mapping remaining.

At operation 870, further information associated with the entry within the tactile label databased that correlated with the remaining entry within the mapping may be presented on the computer processing device.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A labelling system comprising:
   a container with a curved surface;
   a raised tactile label positioned on the curved surface of the container, the raised tactile label including a background and a plurality of projections extending outward from the background, wherein the plurality of projections form a distinct pattern on a lower corner on a first side of the raised tactile label and the distinct pattern on an upper corner on a second side of the raised tactile label;
   an image capturing device configured to capture a plurality of digital images of the raised tactile label;
   a mapping stored in a hardware memory, the mapping including an entry corresponding to the raised tactile label, the entry including shadow data, color data, density data, and further information;
   an image processing device configured to process a first of the plurality of digital images of the raised tactile label to determine the shadow data, the shadow data indicating that a first of the plurality of projections created a shadow on a second of the plurality of projections based on the chrominance of pixels associated with the second plurality of projections, wherein the image processing device determines that the first of the plurality digital images is associated with the entry corresponding to the raised tactile label based on the shadow data;

a user interface configured to communicate the further information associated with the entry.

2. A labelling system of claim 1, wherein the image processing device is configured to determine edges of the captured digital images of the raised tactile label based on the distinct pattern on the lower corner on the first side of the raised tactile label and the distinct pattern on the upper corner on the second side of the raised tactile label.

3. The labelling system of claim 2, wherein the image processing device is configured to partition the captured plurality of digital images of the raised tactile label into a plurality of segments based on the edges.

4. The labelling system of claim 3, wherein the entry in the mapping corresponding to the raised tactile label includes the shadow data, the color data, the density data for each of plurality of segments.

5. The labelling system of claim 4, wherein each of the captured plurality of digital images is processed by the image processing device to be associated with a different segment of the plurality of segments of the raised tactile label.

6. The labeling system of claim 5, wherein the image processing device is configured to determine that the first of the plurality of digital images is associated with the entry corresponding to the raised tactile label based on the shadow data without determine the shadow data of each different segment of the plurality of segments.

7. The labelling system of claim 6, wherein the color data associated with the plurality of segments includes determine a first pixel within a first segment with a first color, and determining colors of pixels that are adjacent to the first pixel.

8. The labelling system of claim 5, wherein the interface device is configured to apply a curved grid over the first of the plurality of the digital images of the raised tactile label, wherein each spatial zone of the curved grid corresponds to the different segments of the plurality of segments.

9. The labelling system of claim 3, wherein the shadows caused by the plurality of raised projections creates variations of shadow data between adjacent pixels.

10. The labelling system of claim 3, wherein the mapping includes a plurality of entries, each entry corresponding to a different raised tactile label.

* * * * *